No. 726,547. PATENTED APR. 28, 1903.
J. N. LEACH.
ODOMETER.
APPLICATION FILED MAR. 25, 1902.
NO MODEL. 2 SHEETS—SHEET 1.

Witnesses—

Inventor—
John N. Leach,
by his Attorney
N. L. Frothingham

No. 726,547. PATENTED APR. 28, 1903.
J. N. LEACH.
ODOMETER.
APPLICATION FILED MAR. 25, 1902.
NO MODEL. 2 SHEETS—SHEET 2.

Witnesses—

Inventor—
John N. Leach,
by his Attorney
N. L. Frothingham

UNITED STATES PATENT OFFICE.

JOHN N. LEACH, OF MELROSE, MASSACHUSETTS, ASSIGNOR TO NATIONAL OIL HEATING COMPANY, A CORPORATION OF MAINE.

ODOMETER.

SPECIFICATION forming part of Letters Patent No. 726,547, dated April 28, 1903.

Application filed March 25, 1902. Serial No. 99,908. (No model.)

*To all whom it may concern:*

Be it known that I, JOHN N. LEACH, a citizen of the United States, residing at Melrose, in the county of Middlesex and State of Massachusetts, have invented certain new and useful Improvements in Odometers, of which the following is a specification, reference being had therein to the accompanying drawings, which form a part of the said specification.

My invention relates to improvements in odometers especially adapted for use in connection with an automobile carriage or other like vehicle, and has for its object to provide a simple and efficient device for measuring and registering the number of miles and fractional parts of a mile traveled over by the said vehicle, and one which can be easily and readily removed from one carriage to another without mutilation of the carriage from which it is removed.

Other and further objects and advantages of the invention will be apparent from the hereinafter-detailed descriptive portions of the specification.

The invention consists of the novel features of construction hereinafter set forth and described, and more particularly pointed out in the claims hereto appended.

Figure 1:
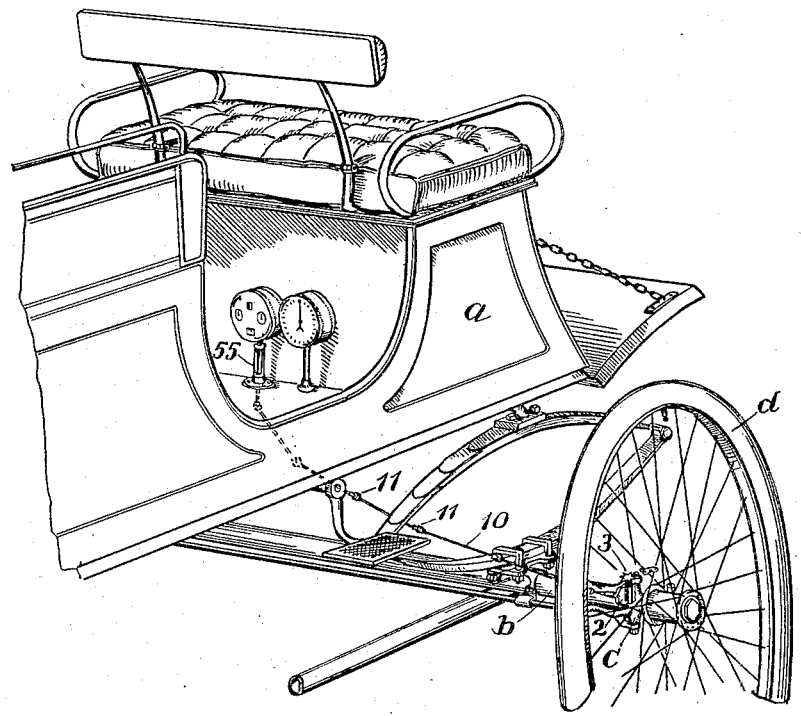
Figure 2:
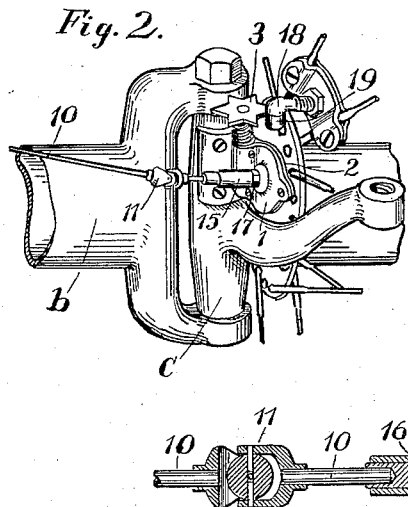
Figure 3:
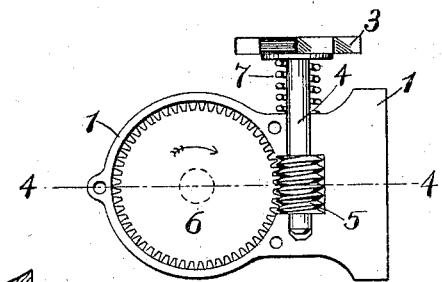
Figure 4:
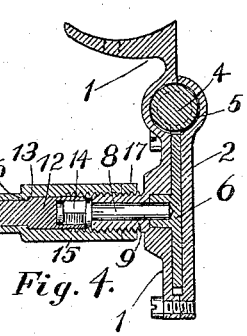
Figure 6:
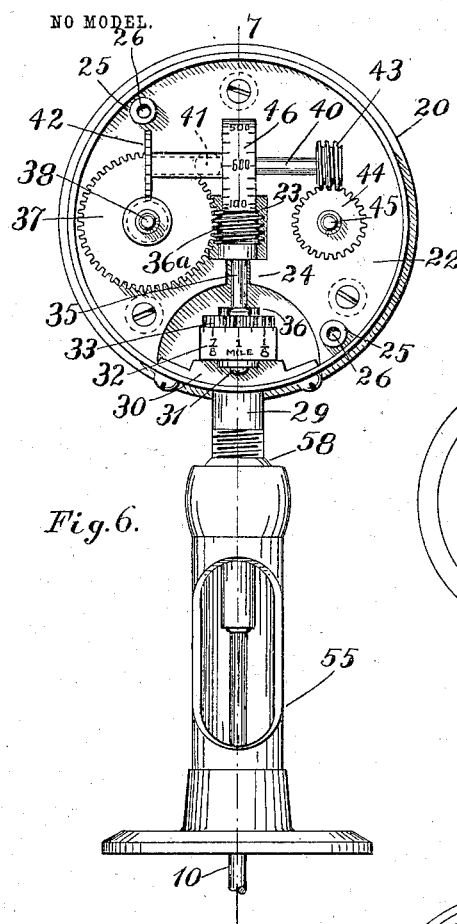
Figure 8:
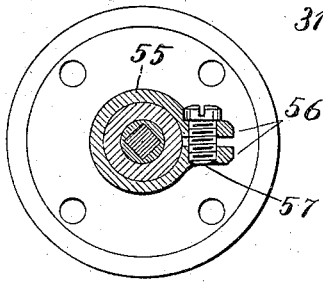
Figure 7:
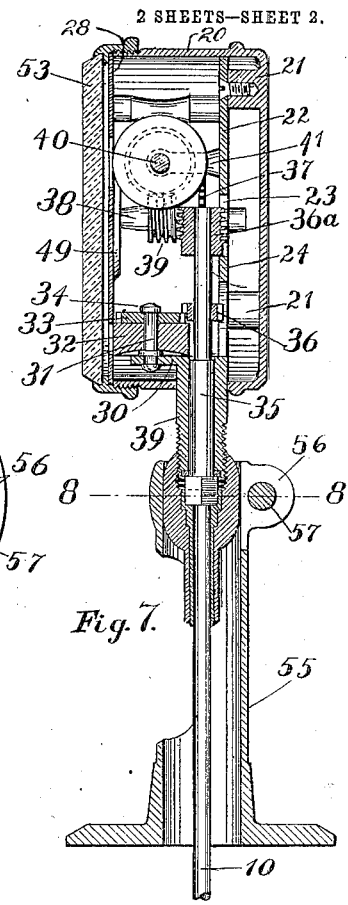
Figure 5:
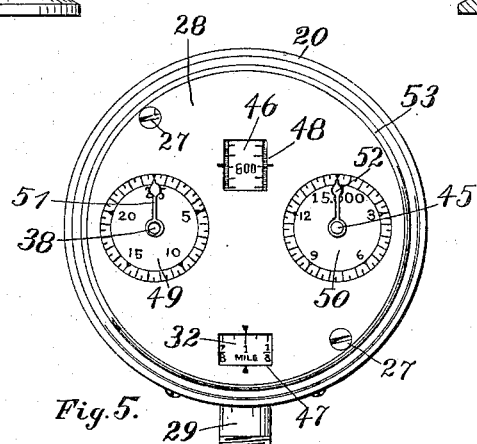

Referring to the drawings, Figure 1 is a perspective view of the device applied to an automobile carriage. Fig. 2 is a perspective view of the ordinary steering-knuckle of an automobile carriage and of the means for operating the registering mechanism. Fig. 3 is a side elevation of the star-wheel and connecting parts, the outer portion of the support for the same being removed. Fig. 4 is a view of a horizontal section, taken on the line 4 4 of Fig. 3. Fig. 5 is a front view of the meter. Fig. 6 is a front view of the same with the face and dial removed, showing also the support or standard. Fig. 7 is a view of a vertical section, taken on the line 7 7 of Fig. 6, the face and dial being added; and Fig. 8 is a view of a horizontal section, taken on the line 8 8 of Fig. 7.

Like letters and numerals of reference refer to like parts throughout the several views.

The invention is shown and described as being affixed to the ordinary automobile carriage provided with a thirty-inch wheel.

$a$ denotes the body of the carriage, supported by springs in the usual manner.

$b$ is the front axle, $c$ the steering-knuckle, and $d$ the wheel, all of the usual and ordinary construction.

1 is a metallic casting secured to the steering-knuckle $c$, and 2 is a supplemental metallic casting suitably secured to the casting 1, which, in conjunction with the casting 2, forms a support and bearing for the six-pointed star-wheel 3, its shaft 4, the worm 5, and the toothed wheel 6, which latter is provided with fifty-six teeth. 7 is a tension-spring coiled around the shaft 4 and seated between the under side of the said star-wheel and the upper portions of the castings 1 and 2.

8 is the shaft or spindle of the wheel 6, having its bearing in the screw-threaded extension 9 of the casting 1 and having a square-shaped outer end. The extension 9 and the shaft 8 are substantially at right angles to the steer-knuckle $c$.

10 is a shafting consisting of metallic rods connected at suitable intervals by the universal joints 11 11. The lower end of the said shafting is provided with an enlarged circular portion 12, having a shoulder 13 and a rectangular recess 14, which latter is adapted to engage with the shaft 8 in substantially the same manner that the ordinary clock-key engages with the barrel-arbor of a clock.

15 is a screw-threaded coupling provided with a shoulder 16 and adapted to be screwed onto the screw-threaded extension 9 of the casting 1. The shoulder 16 is adapted to engage with the shoulder 13 of the shafting 10, and thereby prevents the coupling 15 from falling off the said shafting when disengaged from the shaft 8.

17 is a check-nut for limiting the forward movement of the coupling 15.

18 is a pin or projection suitably secured by means of clamps to the spokes $e$ $e$ and lying substantially at right angles to the steering-knuckle, and 19 is a portion of the said pin or projection 18 extending downwardly therefrom and at substantially right angles therewith and adapted to engage with the star-wheel 3, as will be hereinafter more fully described.

20 is a metallic case having on the inside and made, preferably, integral therewith studs 21 21, each of which is provided with screw-threaded recesses. 22 is a metallic plate adapted to fit into the said case and to be secured thereto by means of screws engaging with the screw-threaded recesses in the studs 21 21. The lower portion of the plate 22 is cut away in the shape of a semicircle and the central portion of the said plate is provided with a rectangular opening 23, the said opening 23 and the said cut-away portion being connected by the slot 24.

25 25 denote standards or supports, preferably made integral with the plate 22 and provided with screw-threaded recesses 26 26, with which the screws 27 27, passing through the dial 28, are adapted to engage for the purpose of securing the latter to the case.

29 is a metallic tube provided at its inner end with the flange 30 and projecting downwardly through the bottom of the case and secured to the latter by means of screws passing through the case and the said flange, to the upper part of which is riveted the stud 31, which forms a shaft for the disk 32 and the gear-wheel 33, which is made integral with the latter. The lower end of the tube 29 is screw-threaded. The disk 32 and the gear-wheel 33 are prevented from slipping off the shaft 31 by means of the knob or head 34 on the upper end thereof. The gear-wheel 33 contains sixteen teeth.

35 denotes a shaft adapted to rotate within the tube 29, provided with the gear-wheel 36, having eight teeth, which is adapted to engage with the gear-wheel 33. The upper end of the shaft 35 terminates in an endless screw or worm 36, which engages with the toothed wheel 37, provided with fifty teeth and rigidly secured to the shaft 38, the inner end of which has its bearing in the plate 22. The shaft 38 near its outer end is provided with the worm 39.

40 is a shaft rotating in a bearing in the upper part of the standard 41, preferably made integral with the plate 22. One end of the shaft 40 is provided with a toothed wheel 42, having twenty-four teeth and adapted to engage with the worm 39. The other end of the shaft 40 is provided with a worm 43, which is adapted to engage with the toothed wheel 44, having twenty-five teeth, the shaft 45 of which has its bearing in the plate 22.

46 is a disk rigidly fastened to the shaft 40 and adapted to rotate therewith. The dial 28 is provided with the rectangular openings 47 and 48, with which the disks 32 and 46 respectively register.

49 and 50 are circular depressions in the dial 28, each being provided with a central opening. The outer end of the shaft 38 projects through the central opening in the circular opening in the circular depression 49 and is provided with a hand 51, and the outer end of the shaft 45 projects through the central opening in the circular depression 50 and is provided with a hand 52.

53 denotes the face of the case, made, preferably, of glass and adapted to be secured to the case by the bezel 54.

The disk 32 is divided into sixteen parts, each of which represents one-sixteenth of a mile, and the disk 46 is divided into twenty-four parts, each of which represents twenty-five miles. The circular depression 49 is divided into fifty parts, each of which represents one-half of a mile, and the circular depression 50 is likewise divided into fifty parts, each of which represents three hundred miles.

The upper part of the flexible shafting 10 is connected with the shaft 35 in substantially the same manner and by substantially the same means that the lower end of the said shafting is connected with the shaft 8, and it will not be necessary to further describe such construction.

55 is a tubular standard or support partially cut away in front and split near the upper end and provided with lugs 56 56, having screw-threaded openings. 57 is a tightening-screw adapted to engage with the said openings. The standard 55 is secured to the floor of the carriage, as indicated in Fig. 1. The flexible shafting 10 passes up through the said floor and through the said support, and the coupling 58, which connects the shafting 10 and the shaft 35, is clamped and held firmly in the upper part of said support by turning the screw 57.

It is to be noted from the construction above described that the whole device may easily and readily be transferred from one carriage to another with practically no mutilation of the carriage beyond a small hole in the floor and that the registering mechanism may be easily removed from the case by simply removing the face and dial and taking out the screws which engage with the screw-threaded recesses in the studs 21 21. The plate 22, which practically supports the greater part of the registering mechanism, may then be readily lifted out. It will be further observed that the action of all the movable parts of the device is a positive action and that there is no lost motion, as will more fully hereinafter be set forth.

The mode of operation of the device in so far as it has not been already disclosed is as follows: As the carriage is driven forward the star-wheel is rotated intermittently by the striking of the pin or projection in the spokes of the wheel against it, one tooth at a time, the tension-spring 7 preventing the rotation of star-wheel by momentum or otherwise. Assuming that the wheel of the carriage is a thirty-inch wheel, it will take approximately six hundred and seventy-two revolutions of the wheel to make a mile. With a six-pointed star-wheel and a toothed wheel with fifty-six teeth, as above described, the shaft 10 will be rotated twice during the mile, and the train of gears in the registering mechanism will be moved so that the disk 32 will rotate once during the mile, the toothed wheel 37 once during every twenty-five miles, the disk 46 once during every six hundred miles, and the toothed wheel 44 once during every fifteen thousand miles, the disk 32 indicating every one-sixteenth of a mile traveled, the hand 51 indicating each one-half mile traveled up to twenty-five miles, the disk 46 indicating every twenty-five miles traveled up to six hundred miles, and the hand 52 indicating every three hundred miles traveled up to fifteen thousand miles.

What I claim, and desire to secure by Letters Patent, is—

1. The combination with a registering mechanism of a driving mechanism comprising a casing provided with a bearing therein for a worm and star-wheel mechanism, means whereby it may be secured to the steering-knuckle of a vehicle-axle and a hollow stem adjacent to and projected at right angles to said bearing and the trunnions of said knuckle, a gear journaled in said casing, the shaft of which extends through and beyond said stem, a worm and star-wheel mechanism actuating said gear and a flexible connection between said gear-shaft and said registering mechanism.

2. The combination with a registering mechanism of a driving mechanism comprising a casing provided with a bearing therein for a worm and star-wheel mechanism, means whereby it may be secured to the steering-knuckle of a vehicle-axle and a hollow stem adjacent to and projected at right angles to said bearing and the trunnions of said knuckle, a gear journaled in said casing, the shaft of which extends through and beyond said stem, a worm and star-wheel mechanism actuating said gear, a flexible connection between said gear-shaft and said registering mechanism and a swivel connection between said flexible connection and said stem whereby said parts are maintained in position.

3. The combination with a registering mechanism of a driving mechanism comprising a casing provided with a bearing therein for a worm and star-wheel mechanism, means whereby it may be secured to the steering-knuckle of a vehicle-axle and a hollow stem adjacent to and projected at right angles to said bearing and the trunnions of said knuckle, a gear journaled in said casing, the shaft of which extends through and beyond said stem, means for actuating said gear and a flexible connection between said gear-shaft and said registering mechanism comprising a plurality of rods united by universal joints, the last of said joints being adjacent to the steering-knuckle whereby the relative position of said connection with said registering and said driving mechanisms and said knuckle is maintained in turning.

4. The combination with a registering mechanism of a driving mechanism comprising a casing provided with a bearing therein for a worm and star-wheel mechanism, means whereby it may be secured to the steering-knuckle of a vehicle-axle and a hollow stem adjacent to and projected at right angles to said bearing and the trunnions of said knuckle, a gear journaled in said casing, the shaft of which extends through and beyond said stem, means for actuating said gear, a flexible connection between said registering mechanism and said gear-shaft comprising a plurality of rods united by universal joints, the last of said joints being adjacent to the steering-knuckle whereby the relative position of said connection with said registering and said driving mechanisms and said knuckle is maintained in turning, and a swivel connection between said flexible connection and said projection whereby said parts are maintained in position.

5. The combination with a registering mechanism of a driving mechanism attached to and movable with the steering-knuckle of a vehicle-axle and a flexible connection between said registering and said driving mechanism comprising a plurality of rods united by universal joints, the last of said joints being adjacent to said steering-knuckle whereby the relative position of said connection with said registering and said driving mechanism and said knuckle is maintained in turning.

In witness whereof I have hereunto set my hand, this 14th day of March, A. D. 1902, in the presence of two witnesses.

JOHN N. LEACH.

Witnesses:
N. L. FROTHINGHAM,
A. A. ASHMAN.